H. Lee,
Jar Trap.
Nº 61,941.     Patented Feb. 12, 1867.
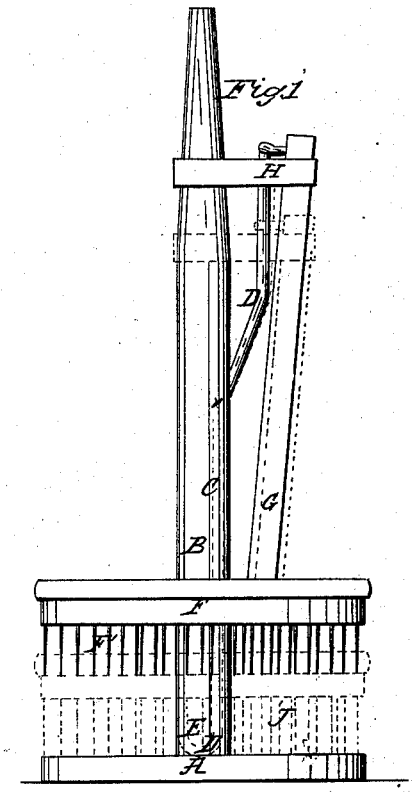
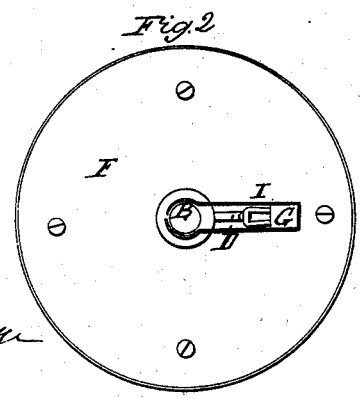
Witnesses:                                   Inventor:

United States Patent Office.

HENRY LEE, OF OBERLIN, OHIO.

Letters Patent No. 61,941, dated February 12, 1867.

IMPROVEMENT IN ANIMAL TRAPS.

The Schedule referred to in these Letters Patent and making part of the same.

TO ALL WHOM IT MAY CONCERN:

Be it known that I, H. LEE, of Oberlin, in the county of Lorain, and State of Ohio, have invented certain new and useful improvements in Animal Traps; and I do hereby declare that the following is a full and complete description of the same, reference being had to the accompanying drawings, making a part of this specification, in which—

Figure 1 is a side view of the trap.
Figure 2 is a top view of the same.
Like letters of reference refer to like parts in the different views.

A, fig. 1, is the floor of the trap, in the centre of which is a standard or post, B; in the side of this standard is cut a groove, indicated by the dotted lines C, the lower end of which terminates in a slot cut through the lower end of the standard. In this slot is pivoted the curved rod D, at the point $x$; the loose end of this rod is bent into a hook, and hangs in the slot above referred to, as indicated by the dotted lines E; the upper end is so bent as to cause it to stand out from the standard, as shown in the drawing, and it being pivoted in the groove allows it to vibrate for a purpose hereafter shown. F is a disk or fall, of the same size and shape as the floor; the under side of this fall is studded with long sharp points, F', and on the upper side is fixed a supplementary standard, G; to the upper end of this standard is fastened the arms of the yoke H, the bow of which is fitted to the post B, upon which it slides and by which the standard G is retained in an upright position, and the fall thereby kept in a longitudinal position to the floor. I, fig. 2, is a staple, driven into the top of the standard, and by which the trap is set in the following manner: To the hook E, referred to above, is attached the end of a string; to the other end is fastened the bait; this end is of a length to retain the bait under the fall or disk; the fall is then raised up and hung upon the end of the rod, by the staple I, as shown in fig. 2. It will be seen by this that as the animal works at the bait or pulls the string, the rod is thrown from the staple, and the fall drops down upon the creature in the direction indicated by the dotted lines J, and is thereby impaled by the long sharp points referred to. The floor of this trap may be covered by meal or straw or any desirable means, so as to hide the string and partially the bait, and thus conceal from the animal, to some extent, the nature of the trap. Also it may be constructed of any size, according to the size of the animal wished to be caught. Instead of the teeth or points, F', there may be a bane or rim secured to the fall or disk, thus, instead of impaling and killing the animal, merely imprisoning it.

What I claim as my invention, and desire to secure by Letters Patent, is—

The fall F, armed with teeth or points, F', standard G, and yoke H, in combination with the post B, baited lever D, and staple I, as and for the purpose set forth.

HENRY LEE.

Witnesses:
    W. H. BURRIDGE,
    E. E. WAITE.